Patented Jan. 8, 1935

1,986,961

UNITED STATES PATENT OFFICE 1,986,961

METHOD OF MAKING LAMINATED PAPER

Lloyd L. Dodge, Rhinelander, Wis., assignor to Rhinelander Paper Company, Rhinelander, Wis., a corporation of Wisconsin No Drawing. Application December 6, 1933, Serial No. 701,155

8 Claims. (Cl. 154—40)

This invention relates to a method of making laminated paper and more particularly to a method of making a highly calendered, relatively transparent laminated sheet of paper, although my invention is applicable generally to the manufacture of any type of laminated paper which requires a calendering step in its preparation.

It has heretofore been customary in the manufacture of laminated paper of a highly calendered type to calender the individual sheets of paper separately and then combine the finished sheets on suitable laminating equipment. In accordance with such prior practice, therefore, there would be as many calendering operations as there were number of plies in the final laminated sheet. This procedure involves numerous disadvantages in the way of attendant higher cost of manufacture and inferior quality of product.

In the calendering of paper, especially in the case of light weight paper, there is a considerable loss because of breakage of the sheet in passing through the calender stack. Also, where the adhesive used in laminating is applied to the surface of a calendered sheet, poorer adhesion is obtained because of the tendency of the adhesive to lie on the surface of the polished, dense sheet rather than to penetrate into and become anchored in the sheet.

Furthermore, where the individual plies of paper making up the final laminated sheet are separately calendered prior to the laminating operation, the cost of calendering is directly proportional to the number of plies in the final laminated product.

According to my present invention, the individual plies of paper are not separately calendered but are first combined into a laminated sheet and the laminated sheet then calendered to produce the finished product. This tends to reduce the breakage on the calender stack and eliminates one or more calendering operations depending upon the number of plies in the laminated product. Further, the combining of the constituent plies under the pressures and at the temperatures attained in the calendering operation results in a greatly improved bond between the plies of the laminated sheet. In fact, the bond is of such strength that the individual plies cannot thereafter be separated intact except by the application of sufficient heat to soften or melt the binding agent.

My invention contemplates either combining the constituent plies on any suitable type of laminating machine prior to the calendering operation, or else combining the plies right at the calender stack. In the latter method, one or more of the constituent plies is coated with a suitable adhesive, cement or the like and the temperature and pressures of the calender stack relied upon to bond a second ply to the coated surface of the first ply.

It is therefore an object of this invention to provide a method of preparing laminated paper in accordance with which the cost of calendering is greatly reduced and the quality of the laminated product considerably improved.

It is a further important object of this invention to provide a method of making a highly calendered, relatively transparent, laminated paper, wherein the constituent plies are combined either ahead of or at the calender stack and the calendering operation is relied upon to bond the plies firmly together and at the same time finish the sheet.

Other and further important objects of this invention will become apparent from the following description and appended claims.

The paper that is to be used in preparing a laminated product embodying my invention may be any type of paper that requires a calendering operation in the course of its manufacture into a laminated product. More specifically, however, my invention contemplates the use of comparatively well hydrated stock, such as is used in the manufacture of sulphite, greaseproof, glassine and parchmentized paper. These types of paper are largely used in the manufacture of laminated papers for the reason that they are relatively transparent after super calendering and possess desirable properties of flexibility and strength that adapt them for wrapping purposes. In order to increase the softness and flexibility of papers of this character, they may be plasticized in the course of their manufacture in accordance with the method disclosed in my copending application entitled "Method of and apparatus for treating paper", Serial No. 647,953, filed December 19, 1932, and my copending application entitled "Paper and method of making same", Serial No. 698,075, filed November 15, 1933.

Various weights of paper may be used in making my laminated product, but, in general, it is customary to use the lighter weights, such as those ranging between 15 lbs. and 35 lbs. per ream. According to one embodiment of my invention, the paper is finished on the paper machine, which may be of the Fourdrinier, cylinder or Yankee Fourdrinier type, and is then coated on one side with a suitable adhesive. The adhesive may be any of the known types commonly used in making laminated paper, such as the so-called cements, hot melt adhesive or the glue type of adhesive. The cements include solutions of a bonding agent in a volatile organic solvent, of which rubber dissolved in benzene and cellulose nitrate and resins or gums dissolved in lacquer solvents are typical examples. I prefer to use the latter type of cement since it gives a more satisfactory and more permanent bond and imparts moistureproof properties to the laminated sheet.

After the sheet has been coated with a cement, or other adhesive, it is run through the usual type of laminating equipment to combine it with another sheet of similar or different character, but uncoated. In the laminating operation, the superimposed plies are subjected to only a light pressure and to a temperature sufficient to effect the bonding of the sheet. Where a three ply sheet is to be made, one sheet may be coated on both of its sides with a cement and then run between other, uncoated sheets, one on each side, through the laminating machine.

Where the sheets are to be treated prior to the final calendering operation, I prefer to combine the individual plies as just described. The laminated sheet is then subjected to the desired treatment before passing it through the supercalenders. As an example of a suitable type of treatment, the laminated paper may be subjected to a moistening operation, using either plain water or water having dissolved therein a suitable plasticizing agent, such as glycerine, a hygroscopic sugar like glucose or dextrose, or combinations of hygroscopic liquids and solids. The paper is preferably moistened until it contains between 10 and 40% of water, usually around 25%, and after the paper has stood in the form of a roll until the moisture has uniformly penetrated throughout the mass, the paper is then passed through the supercalenders.

Supercalenders having steam heated rolls are preferably employed, since this type of supercalender imparts a higher finish and greater transparency to the sheet than would supercalenders of the book paper type. As is well known, glassine supercalenders are built up with alternate compressed fiber and steam heated chilled steel or iron rolls. These rolls are maintained under heavy pressure and are heated to raise the temperature of the cement or other bonding agent above its softening point and cause the bonding agent to be thoroughly impregnated into and anchored in the fibers of the constituent plies of paper as the laminated paper is passed through the calender stack.

In another embodiment of my invention, the constituent plies are not subjected to a laminating operation ahead of the supercalenders but the laminating is carried out directly upon the supercalender stack. As before, one or more of the constituent plies is coated with a heat sealing or thermoplastic cement, adhesive or the like and another ply, or plies, of uncoated paper is led into the calender stack in superimposed relation to the coated ply. The pressure and temperature of the calender stack are sufficient to effect the bonding of the constituent plies and thus form the laminated product directly on the supercalender stack.

It is thus apparent that my invention contemplates the carrying out of the bonding and finishing operation simultaneously on a calender stack, rather than employing separate calendering steps for each constituent ply and a separate laminating operation. One of the great advantages of my method is that the sheet passes through the supercalender stack as a multiple sheet composed of a number of thinner sheets, so that the percentage of waste due to breakage on the calender stack is greatly reduced.

Furthermore, due to the fact that the cement or adhesive is applied to the paper before it has been heavily calendered, the adhesive or cement has a greater tendency to become anchored in the sheet. This makes for better bonding of the constituent plies in the final laminated product. The better character of the bond in my product is also responsible for the greater strength of my laminated product on the same weight basis than laminated papers made in accordance with heretofore known methods.

By the use of certain types of cements and adhesives, the properties of the laminated product may be greatly improved, as to its transparency, and its resistance to the penetration of moisture, water, grease and gases. For this reason, I prefer to use a cement of the thermoplastic type such as may be prepared by the use of nitrocellulose, resins, gums and waxes in accordance with well known practice. A cement that is particularly suited for my purposes is described in the Roy W. Sexton Patent No. 1,926,918. A cement of this character forms, upon evaporation of the organic solvent, a thermoplastic coating that is non-tacky at low or ordinary room temperatures but which exhibits excellent bonding properties when heat and pressure are applied. Where the sheets are to be laminated before being passed through the supercalenders, sufficient heat and pressure is used to effect a fairly good bond between the constituent plies so that the sheets may thereafter be handled as a single sheet and be subjected to any desired treatment, as, for instance, the treatment with moistening and plasticizing agents as above described.

The use of my method of laminating paper greatly reduces the amount of cement, or adhesive, required to effect a satisfactory bond, due to the greatly more efficient bonding action that can be obtained on supercalenders than is possible on the usual type of laminating machine. As little as two pounds of solid bonding agent per ream of paper may be used in my process, where for substantially equivalent bonding strength, almost twice as much solid bonding agent per ream of paper would be required in the usual laminating process.

Where particularly improved resistance to the penetration of moisture and water is not required in the finished laminated product, various types of adhesives, such as glue, casein, silicates and the like may be employed. It is also possible to employ hot melt adhesives, which are generally mixtures of resins, gums and waxes and which are used without volatile solvents. The hot melt type of adhesive is applied in a heated, molten condition to the surface of one of the plies and another ply combined therewith while the adhesive is in that condition.

It will be understood that although my invention has been described chiefly in connection with the manufacture of laminated glassine paper and other papers of that general character, my process is applicable to the manufacture of any type of laminated paper or fibrous material in the course of which the paper or fibrous material is to be heavily calendered, or may advantageously be heavily calendered. By the term "heavy calendering" is meant the subjecting of paper or other fibrous material to a rolling and smoothing operation at pressures in excess of 1,000 lbs. per sq. in.

I am aware that numerous details of the process may be varied through a wide range without departing from the principles of this invention, and I, therefore, do not purpose limiting the patent granted hereon otherwise than necessitated by the prior art.

I claim as my invention:

1. The method of forming laminated glassine paper, which comprises adhesively securing together a plurality of plies of uncalendered grease-proof paper in superimposed relation with a thermoplastic bonding agent and subjecting the plied material to a supercalendering operation at an elevated temperature to thoroughly bond the plies together and simultaneously finish their outside surfaces.

2. The method of making laminated glassine paper, which comprises coating a web of uncalendered grease-proof paper on one side thereof with a bonding agent having resistance to the penetration of water and moisture, imposing another web of uncalendered grease-proof paper on the coated side of the first web, and calendering the two webs together to bond their inside surfaces and finish their outside surfaces.

3. The method of making relatively transparent laminated paper, which comprises interposing a layer of thermoplastic cement between plies of dried uncalendered well hydrated paper, incorporating between 10% and 40% by weight of water into said plied paper, and finally subjecting said plies to heavy calendering pressure at an elevated temperature to create a firm bond between the plies and to finish their outside surfaces.

4. The method of making laminated glassine paper, which comprises interposing a layer of thermoplastic cement between superimposed plies of uncalendered grease-proof paper, incorporating between 10% and 40% by weight of water into said plied paper, and finally subjecting said plies to heavy calendering pressure at an elevated temperature to create a secure bond between said plies and to finish their outside surfaces.

5. A laminated relatively transparent paper comprising constituent plies of well hydrated paper having uncalendered surfaces joined together by a bonding agent and having highly calendered exposed outside surfaces to impart a smooth finish to the paper.

6. A laminated supercalendered glassine paper composed of constituent plies of grease-proof paper having uncalendered surfaces joined together by a thermoplastic cement, the outside surfaces of said laminated paper being highly calendered.

7. A transparent and flexible laminated glassine paper composed of constituent plies of grease-proof paper having uncalendered surfaces joined together by a bonding agent having good resistance to the penetration of water and moisture, the exposed surfaces of said plies being highly calendered to impart a smooth finish to the laminated sheet.

8. The method of making relatively transparent laminated paper, which comprises joining together by means of an adhesive a plurality of plies of well hydrated light weight paper and subjecting the plied material in a moistened condition to heat, pressure and friction on a glassine type supercalender to simultaneously bond the plies together and finish their outside surfaces.

LLOYD L. DODGE.